Oct. 1, 1957  G. L. KELLY  2,808,574
SWIVEL CONNECTOR FOR ELECTRIC CORDS
Filed May 9, 1955
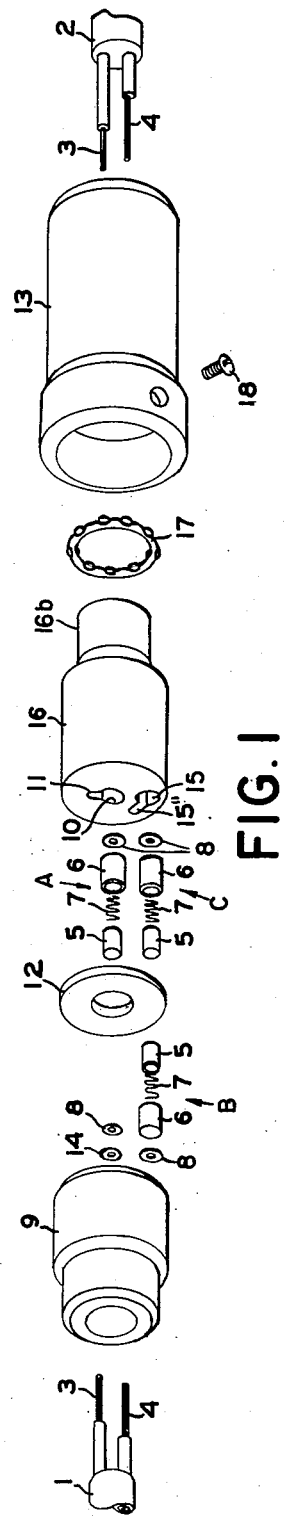
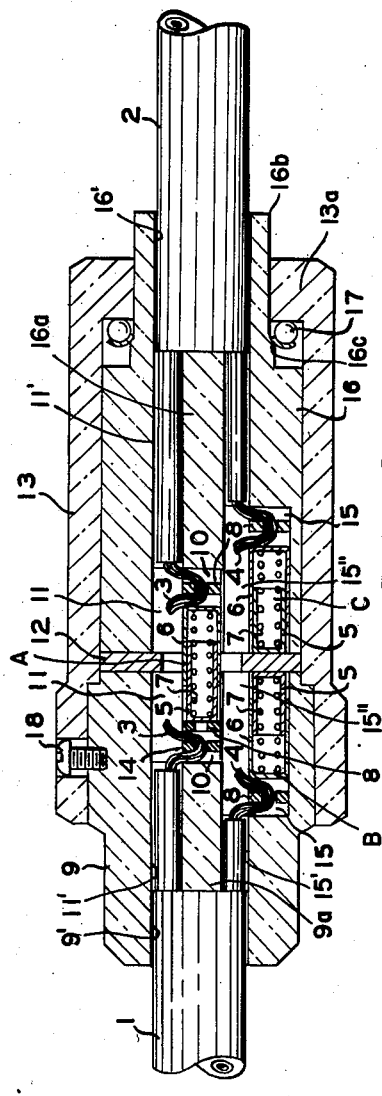
INVENTOR.
GEORGE L. KELLY
BY
*Merrill M. Blackburn*
ATTORNEY

United States Patent Office 2,808,574
Patented Oct. 1, 1957

2,808,574

SWIVEL CONNECTOR FOR ELECTRIC CORDS

George L. Kelly, Davenport, Iowa

Application May 9, 1955, Serial No. 507,069

3 Claims. (Cl. 339—8)

The present invention relates to a swivel connector for electric cords and pertains particularly to the end connection of the wires leading into the swivel members of the connection.

This invention resides in the combination, construction, and arrangement of parts illustrated in the accompanying drawings and, while I have shown therein what is now regarded as the preferred embodiment of this invention, I desire the same to be understood as illustrative only and not to be intrepreted in a limiting sense.

In the drawings annexed hereto and forming a part hereof,

Fig. 1 is an exploded view of this connector; and

Fig. 2 represents a longitudinal section of the assembled connector.

The swivel connector comprises a first cylindrical non-conductor member 16, an alined second non-conductor member 9, a conductor washer 12, a tubular non-conductor housing 13, a central telescopic spring-loaded conductor cartridge A and a pair of eccentric telescopic spring-loaded conductor cartridges B and C each made up of elements 5 and 6 and a spring 7, and wire retaining washers 8 and 14, together with other components to be described below:

The member 9 has an axial cable bore 9' at its outer end and an axial cartridge bore 10 at its radial inner end, these two bores being separated by an intervening interior wall portion 9a. The member 9 also has an eccentric cartridge bore 15 opening at the inner end of the member to the annulus of the washer 12, which, as best shown in Figure 2, intervenes between the members 9 and 16 and is abutted from opposite radial sides of the annulus by the radial inner ends of the members. The members 9 and 16 are interiorly symmetrical and accordingly the member 16 has at its outer end an axial cable bore 16' and at its inner end an axial cartridge bore 10, the two bores being separated by an intervening interior wall portion 16a. The member 16 further has an eccentric cartridge bore 15 at its inner end in register with the anulus of the washer 12.

In the member 9, the wall portion 9a has therethrough a relatively small first wire bore 11' opening to the bore 10 as a groove 11 to give the bore 10 a keyhole effect, as will be seen in Figure 1 relative to the same relationship between the bore 10 and bore 16' via a first wire bore 11' and groove 11. Since each wire bore 11' is so much smaller than the cable bore and central cartridge bore it is slightly radially offset relative thereto. Hence, a cable 1, received in the cable bore 9', has a first wire 3 passed through the wire bore 11' and bent or offset into the central cartridge bore 10, passing through a small washer 14 of a size to just fit the bore 10; the cable 1 has a second wire 4 passed through a second wire bore 15' which leads through the wall portion 9a to the eccentric cartridge bore 15 as a grove 15", this second wire being bent or offset into the bore 15 and passed through a washer 8 similar to the washer 14 whereby the wire 4, like the wire 3, is retained against axial separation from the member 9. These wire connections will be improved if the wires are tinned. A second cable 2 is received in the cable bore 16' of the member 16 and has a first wire 3 passed through the wire bore 11' and bent into the central cartridge bore 10, hooking thence through a small washer 8; the second cable has a second wire 4 passed through the second wire bore 15' in the member 16 and bent into the eccentric cartridge bore 15 in said member via the groove 15" and a washer 8, again the keyhole effect being present as best seen in Figure 1.

The members 9 and 16 are interconnected by the housing 13 for relative rotation and are retained against axial separation, the housing having removable means, such as a screw 18, connected to the member 9, having further means, here an apertured radial end wall 13a receiving a reduced hub 16b on the member 16, for preventing axial separation of the members. A ball bearing ring 17 disposed coaxially within the tubular housing thrusts against the radial wall 13a and against a shoulder 16c on the hub 16b to provide an appropriate journal.

The central cartridge A is carried by the coaxial central cartridge bores 10, passing freely through the aperture in the washer 12 and electrically contacting the first wires 3. If desired, a washer 8 may be interposed between the wire 3 of the cable 1 and one end of the central cartridge to improve contact and relative rotation, although it will be clear that the cartridge elements 5 and 6 may turn relative to each other. Electrical contact between the second wires 4 of the cables 1 and 2 is made by the two eccentric cartridges B and C, which are received respectively by the eccentric cartridge bores 15 and which contact opposite sides of the annulus of the washer 12, the other ends of these cartridges electrically contacting the respective wires 4. Hence, the two members 9 and 16 are relatively rotatably interconnected and held against axial separation by the housing 13, the central wires 3 are electrically connected by the central cartridge A, and the outer wires 4 are electrically connected by the eccentric cartridges B and C and the washer 12, and relative rotation can occur without twisting the cables 1 and 2.

What is claimed is.

1. A swivel connector, comprising: a first cylindrical non-conductor member having a radial inner end and an axially opposite outer end; a conductor washer disposed coaxially at and having one side of said annulus abutting said radial inner end; a second non-conductor member having a radial inner end abutting the opposite side of the washer annulus and having an axially opposite outer end; a tubular concentric housing around the members and leaving the outer ends of the members exposed, said housing having means removably secured to the second member and means engaging and journaling the first member for relative rotation but preventing axial separation from the second member; each member having respectively at its inner and outer ends an axial cartridge bore and a coaxial cable bore separated by an intervening interior wall portion, said wall portion having therethrough a relatively smaller first wire bore intercommunicating the cartridge and cable bores, each member further having at its inner end an eccentric cartridge bore opening to the washer annulus and terminating at said wall portion, said wall portion having therethrough a second smaller wire bore intercommunicating said eccentric cartridge bore and the cable bore; a pair of cables received respectively by the cable bores, each cable having a first wire passing through the first wire bore and offset into the central cartridge bore and a second wire passing through the second wire bore and offset into the eccentric cartridge bore; a central telescopic spring-loaded conductor cartridge received in the central cartridge bores and passing freely through the washer aperture and in electrical contact at opposite ends with the respective first wires; and a pair of eccentric telescopic spring-loaded conductor cartridges, one in each eccentric cartridge bore, said eccentric cartridges respectively electrically contacting the second wire and respectively contacting opposite side of the washer annulus in electrical contact therewith.

2. The invention defined in claim 1, in which: the first member has at its outer end a coaxial reduced hub; the housing has a radial end wall apertured to receive said hub; and bearing means is interposed between said radial wall and hub and enclosed by the housing.

3. The invention defined in claim 1, in which: the means removably securing the housing to the second member comprises a screw passed radially through the housing and into said second member.

References Cited in the file of this patent

UNITED STATES PATENTS

| | | |
|---|---|---|
| 2,119,168 | Kus | May 31, 1938 |
| 2,459,032 | Korth | Jan. 11, 1949 |
| 2,715,713 | Seim | Aug. 16, 1955 |